United States Patent [19]

Achterholt

[11] 4,371,051
[45] Feb. 1, 1983

[54] AUTOMATIC SWITCHING-OFF ARRANGEMENT

[76] Inventor: Rainer Achterholt, Paul-Zoll-Str. 3, D-8961 Waltenhofen 1, Fed. Rep. of Germany

[21] Appl. No.: 190,043

[22] Filed: Sep. 23, 1980

[30] Foreign Application Priority Data

Sep. 28, 1979 [DE] Fed. Rep. of Germany ... 7927688[U]

[51] Int. Cl.³ ............................................. B60K 41/08
[52] U.S. Cl. .................................... 180/271; 74/872; 74/878; 123/198 DB; 123/198 DC
[58] Field of Search ................. 74/851, 852, 853, 854, 74/855, 850, 872, 878; 123/198 DB, 198 DC; 180/271, 272, 287, 336

[56] References Cited

U.S. PATENT DOCUMENTS

| 4,192,279 | 3/1980 | Maisch et al. | 123/198 F |
| 4,215,596 | 8/1980 | Long | 74/851 |
| 4,270,414 | 6/1981 | Tellert | 74/852 |

Primary Examiner—Joseph F. Peters, Jr.
Assistant Examiner—Michael Mar
Attorney, Agent, or Firm—Offner and Kuhn

[57] ABSTRACT

An automatic switching-off arrangement for the internal combustion engine of a motor vehicle comprises a sensor which senses the neutral position of the gear control lever or the idle running condition of the engine or the standstill condition of the vehicle. When the sensor detects such a condition a delay switch is energized which activates a switch-off means after a predetermined period so that the current supply to the ignition coil is interrupted or a half-compression device is operated and the engine is stopped. Thereby, fuel can be saved and pollution of the atmosphere can be reduced.

1 Claim, 5 Drawing Figures

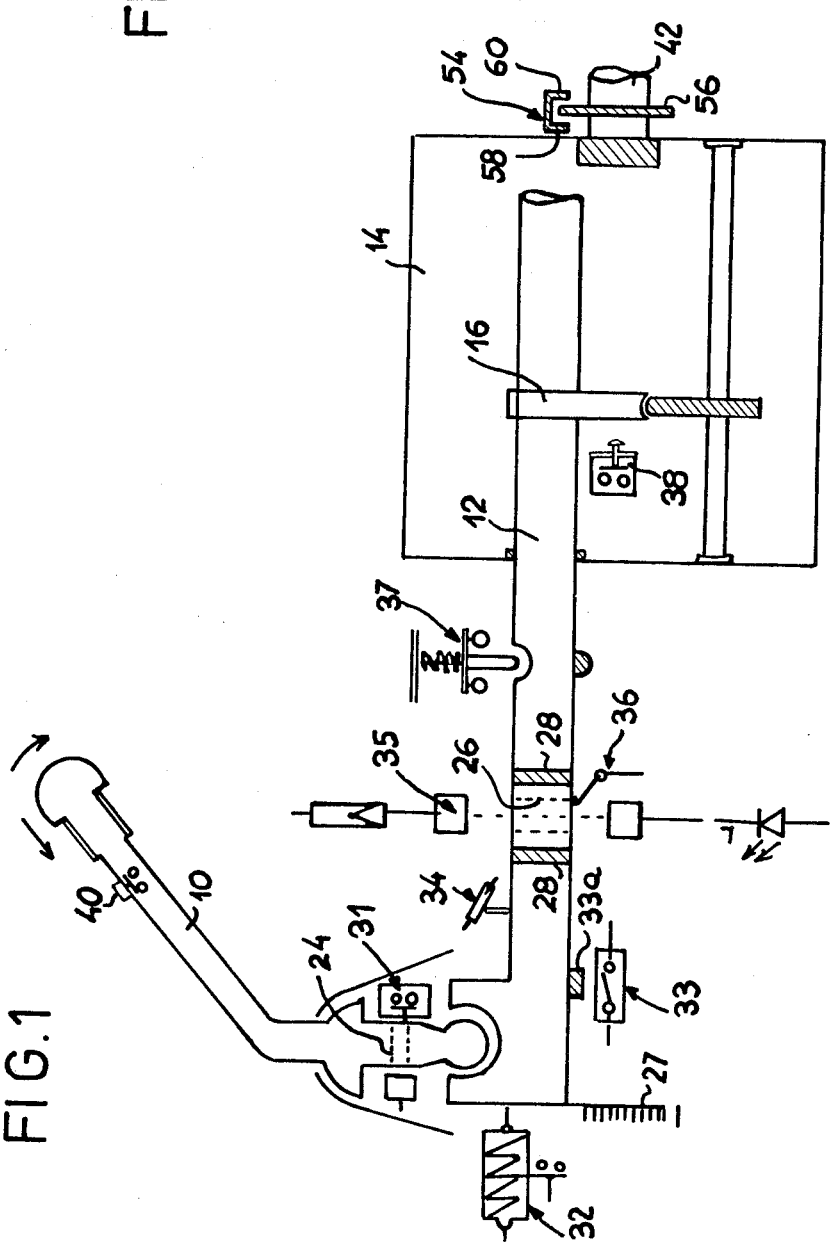
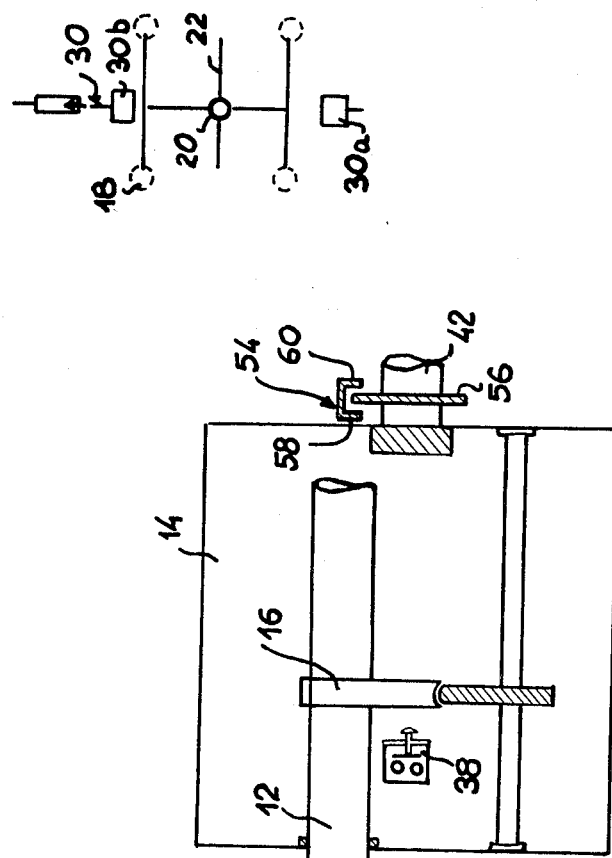
FIG.1
FIG.2

AUTOMATIC SWITCHING-OFF ARRANGEMENT

BRIEF SUMMARY OF THE INVENTION

The invention relates to an arrangement for switching-off the internal combustion engine of a motor vehicle.

One object of the invention is to provide a new switch-off arrangement for motor vehicle engines to avoid an unnecessary running of the engine in idling condition.

A further object of the invention is to provide a sensor detecting a standstill of the vehicle or detecting the idling condition of the engine and to switch off the engine automatically after the sensor has detected that vehicle or engine condition.

According to one embodiment of the invention, the sensor is arranged in the region of the neutral position of the gear control lever or the gear mechanism.

According to a second embodiment of the invention, the sensor is arranged in the region of one car wheel or the driving shaft of which. A third embodiment consists in that the sensor is a fuel flow rate measuring device arranged in the fuel feed pipe or is a speed counter detecting the idle running speed of the crankshaft or is arranged to respond to the idle position of the accelerator pedal or throttle valve of the engine or is a low pressure meter detecting the pressure in the air inlet pipe of the engine. In these two latter embodiments, an important further feature consists in that an electric circuit, including the switch-off means is provided with a second switch responding to the position of the clutch in the case of a hand-operated gear or to the braking condition of the brake mechanism in the case of an automatic gear inactivating the switch-off means upon operation of the clutch or brake mechanism.

The inventive arrangement advantageously saves substantial amounts of fuel and reduces pollution of the atmosphere.

BRIEF DESCRIPTION OF THE DRAWINGS

FIG. 1 a schemtic view of a hand-operated gear mechanism showing a plurality of arrangements for detecting the idle or neutral position of the gear mechanism and it should be evident that only one of the arrangements as shown is used;

FIG. 2 is a schematic plan view of a gate type gear shift according to FIG. 1;

DESCRIPTION OF THE PREFERRED EMBODIMENTS

Figure 3:
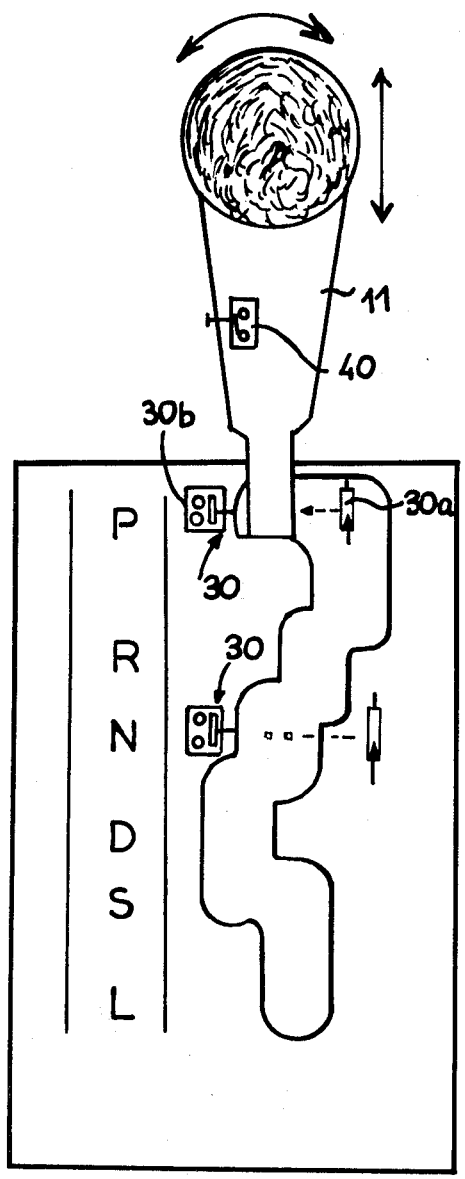
FIG. 3 is a perspective view of an automatic gear arrangement.

FIG. 1 shows a gear shift lever 10 engaging a gear shaft 12 for operating a motor vehicle gear 14 by means of a gear shift fork 16. According to FIG. 2, an H-type gate is shown and the lever 10 has four shift positions 18 corresponding to four different speeds and one neutral or idle position 20 which is detected by a sensor 30 which, according to FIG. 2, consists of a luminous diode 30a and a phototransistor 30b which lie on a transverse line intersecting the lever 10 in the neutral position 20. Therefore, in the position 20, the phototransistor 30b receives no light. When the lever is shifted into one of the positions 18, the phototransistor produces an output signal which controls a switch 50 of a switch arrangement as explained below.

Figure 5:
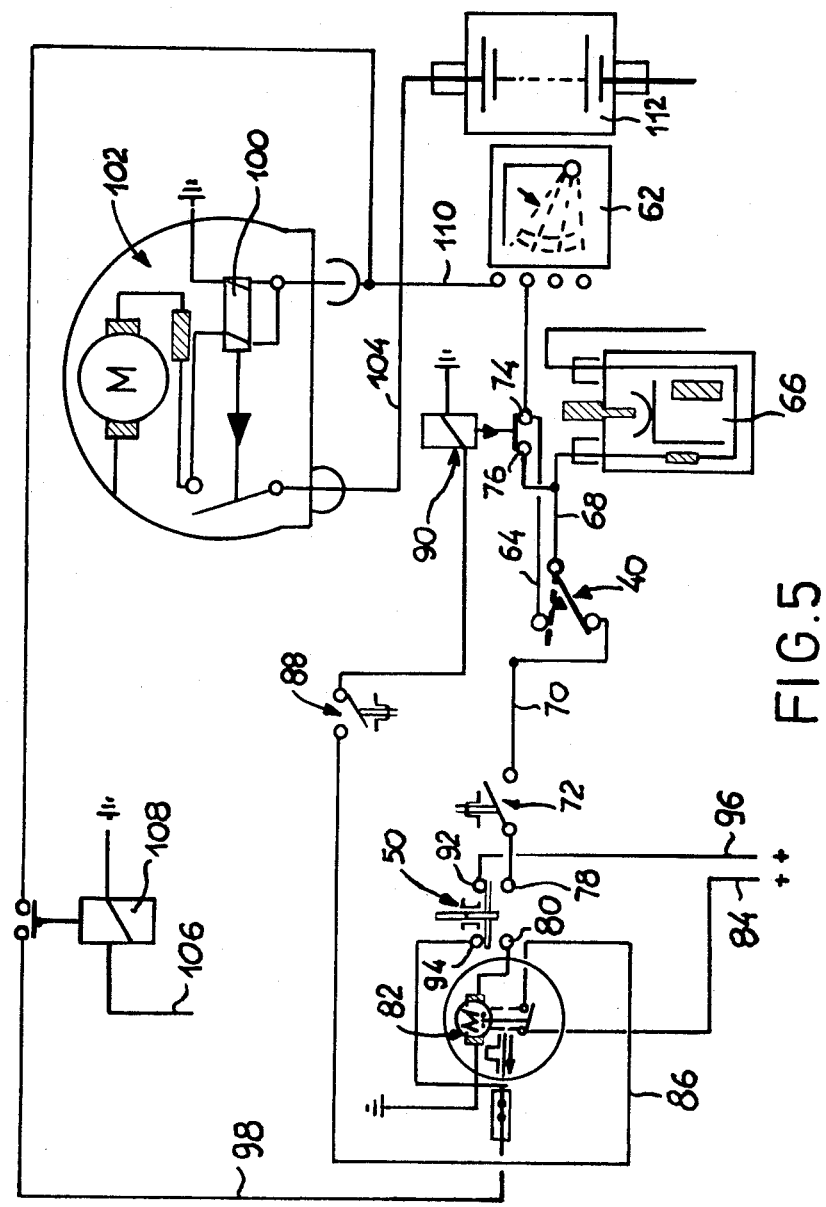
FIG. 5 is a wiring diagram showing the components for switching-off the engine of using a sensor as shown in FIG. 1.

Instead of the crosswise light ray sensor 30, a lengthwise beam sensor 31 can be used to detect the neutral position of the lever 10. In this embodiment, the bottom of lever 10 forms a crosswise extending plate covering the phototransistor in all positions except the neutral position of the lever in which the light beam runs through a bore 24 in the lever plate activating the phototransistor which is combined with a switch 50 (FIG. 5).

Instead of detecting the position of the control lever 10, the neutral position of the gear shaft 12 can be detected, for example, by an electric switch 32, the stem of which is directly displaced by the shaft 12, or by a reed switch 33 arranged at the gear tunnel and a magnet 33a fixed at the shaft or by a mercury switch 34 operable by a cam of the shaft or by a light beam switch 35 the luminous diode of which sends its light ray through a bore 26 of the shaft when the shaft is in neutral position. Also, a simple sliding contact switch 36 can be used, in cooperation with the shaft 12, which has a portion insulated by a pair of insulator discs 28 or is surrounded by an insulator sleeve. The shaft has body contact by a line 27 except at its insulated portion. Also, a switch 37 can be used, the stem of which engages a groove of the shaft in the neutral position. Last, but not least, the position of gear components within the gear box 14 can be detected by a switch 38, for example, the position of the gear shift fork 16.

At the control lever 10 (FIG. 1) and 11 (FIG. 3) a handoperated switch 40 is arranged by which the automatic switch-off arrangement can be made inoperative.

FIG. 3 shows the cover plate of an automatic gear. The control lever 11 can be shifted between a parking position "P", a neutral or idling position "N" and driving positions. A pair of series-connected optoelectronic sensors 30 are arranged at the "P"-position and the "N"-position of the lever 11 is arranged respectively. In these two positions, the light beam of the luminous diode 30a directed to the phototransistor 30b is interrupted respectively and the automatic switch-off arrangement is activated.

Figure 4:
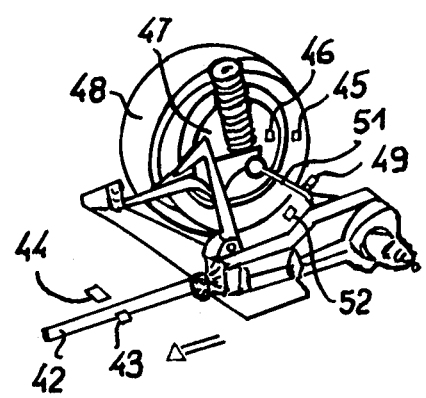
FIG. 4 is a perspective view of a car wheel and the drive shafts of illustrating three different arrangements for detecting the standstill of a vehicle.

FIG. 4 shows some possibilities for directly detecting the standstill of the vehicle. A magnet 43 fixed on the main drive shaft 42 passes by a reed switch 44 which produces pulses when the shaft rotates. Upon a standstill of the vehicle, no pulses are produced. This condition is detected by an electronic circuit which operates the switch 50 (FIG. 5). Alternatively, a magnet 45 can be fixed at the car wheel 48 and a pulse generator 46 can be arranged at the wheel bearing block 47. Instead of that, a magnet 49 can be provided at the wheel drive shaft 51 and in the rotation plane of which a pulse generator 52 can be arranged.

In FIG. 5, an electric line 64 connects an ignition switch 62 with the hand-operated switch 40 and, in the position shown with dashes, the automatic switch-off arrangement is interrupted and an ignition coil 66 is connected via lines 64, 68, switch 40 and key operated switch 62 with a battery 112. When switch 40 is switched into the position shown in full lines, current flows along line 70 to a temperature switch 72 which closes after the internal combustion engine has reached its operating temperature. When the sensor according to one of the aforementioned embodiments, detects the standstill condition of the vehicle or the idle running condition of the engine, the switch 50 is operated and closes the contacts 78, 80 whereby a time delay switch 82 is activated-which can be adjusted by hand-operation-to connect an external supply line 84 with a line 86 after some seconds. Switch 88 responds to the voltage of the battery 112 and is closed in normal battery condition. Therefore, a switch-off relay 90 is energized opening the bridge between the contacts 74, 76. The current to the ignition coil 66 is interrupted and the engine is stopped.

In order to start the engine again according to the embodiments of FIGS. 1 to 3, it is only necessary to move the gear control lever 10 or 11 out of the neutral position, whereby switch 50 moves into its opposite position opening contacts 78, 80 and closing contacts 92, 94. The relay 82 disconnects the switch-off relay 90 from the supply line 84 and the switch between the contacts 74, 76 closes again. The ignition coil 66 gets voltage. At the same time current from line 96 which is connected with the battery 112 flows via line 98 to a current pulse relay 100 of the starter 102 of the engine. Via line 104, the starter is energized and the engine is started. As soon as the electric generator of the engine produces current a relay 108 is energized via line 106 and the starting line 98 will be interrupted.

When instead of sensors 30–38, sensors according to FIG. 4 are used, switch 50 remains in its automatic switch-off position as long as the vehicle is in standstill position independently on the shift position of the gear. In this case, the delay relay 82 is constructed to automatically open the bridge between the lines 84, 86 after the engine has been stopped. Thereby switch-off relay 90 closes contacts 74, 76 and the ignition coil is energized, so that the engine can be started by turning the key in the ignition switch 62 as known per se. Alternatively, the engine can be re-started by turning or depressing the knob of the gear control lever 11 as shown in FIG. 3 by arrows. The knob operates a switch—not shown—connecting the starter relay 100 with the battery.

In the case that the sensor detects the standstill of the vehicle directly, for example, by controlling the rotating components of the vehicle driving mechanism, or in the case that the sensor detects the idle running condition of the engine directly and not via the position of the gear, it must be avoided that the automatic switching-off takes place when the vehicle is stopped for only a short period. This can be reached by an additional switch operated by the clutch pedal of the vehicle in the case of a shift gear mechanism or by the brake pedal in the case of an automatic gear. The switch is inserted in lines 70 or 86 of FIG. 5 and is opened when the clutch or brake pedal is operated.

I claim:

1. An improved arrangement for automatically switching-off the internal combustion engine of a motor car, the motor car being of the type having a power transmission system, gear shift means, a control lever operatively connected to the gear shift means for operating the gear shaft means, sensing means responsive to a movement of one of the control lever and the gear shaft means, the sensing means including a pair of sensing elements cooperating with one another and forming a switch, and time delay means operatively connected to said switch for delaying the switching-off of the internal combustion engine, the improvement comprising at least one of the pair of sensing elements which forms said switch being immovably fixed relative to the movement of one of the control lever and the gear shaft means, and the sensing means being responsive in the neutral position of the gear shift means and the control lever to close said switch and permit the transmission of a switch-off signal to activate said time delay means, and thereby initiate switching-off of the internal combustion engine.

* * * * *